US012057283B2

(12) United States Patent
Ehrhardt et al.

(10) Patent No.: US 12,057,283 B2
(45) Date of Patent: Aug. 6, 2024

(54) OVERVOLTAGE PROTECTION ARRANGEMENT WITH A HORN SPARK GAP, LOCATED IN A HOUSING, WITH A CHAMBER FOR ARC QUENCHING

(71) Applicant: DEHN SE, Neumarkt i.d.OPf. (DE)

(72) Inventors: Arnd Ehrhardt, Neumarkt (DE); Ralph Brocke, Ilmenau/Oberpörlitz (DE); Peter Zahlmann, Neumarkt (DE)

(73) Assignee: DEHN SE, Neumarkt i.d.OPI. (DE)

( * ) Notice: Subject to any disclaimer, the term of this patent is extended or adjusted under 35 U.S.C. 154(b) by 376 days.

(21) Appl. No.: 17/422,185

(22) PCT Filed: Nov. 18, 2019

(86) PCT No.: PCT/EP2019/081586
§ 371 (c)(1),
(2) Date: Jul. 10, 2021

(87) PCT Pub. No.: WO2020/148000
PCT Pub. Date: Jul. 23, 2020

(65) Prior Publication Data
US 2022/0084772 A1     Mar. 17, 2022

(30) Foreign Application Priority Data
Jan. 17, 2019   (DE) .......................... 102019101212.0

(51) Int. Cl.
*H01H 85/055*    (2006.01)
*H01H 9/32*      (2006.01)
(Continued)

(52) U.S. Cl.
CPC ............ *H01H 85/055* (2013.01); *H01H 9/32* (2013.01); *H01H 9/46* (2013.01);
(Continued)

(58) Field of Classification Search
CPC .......... H01H 85/055; H01H 9/32; H01H 9/46; H01H 85/0241; H01H 85/165;
(Continued)

(56) References Cited

U.S. PATENT DOCUMENTS 9,019,680 B2    4/2015   Hierl et al. .................... 361/137
9,083,153 B2    7/2015   Ehrhardt et al.
(Continued)

FOREIGN PATENT DOCUMENTS

CN    105103393 A    11/2015    ............... H01C 7/12
CN    105186293 A    12/2015    ............. H01T 21/06
(Continued)

OTHER PUBLICATIONS

Office Action (in Hindi and English), dated Dec. 8, 2021, issued by the Indian Patent Office for Applicant's corresponding German Patent Application No. IN202017042875, filed Oct. 1, 2020.
(Continued)

*Primary Examiner* — Jacob R Crum
(74) *Attorney, Agent, or Firm* — Bodner & Bodner, PLLC; Christian P. Bodner; Gerald T. Bodner

(57) ABSTRACT

The invention relates to an overvoltage protection arrangement comprising a horn spark gap located in a housing, with a chamber for arc quenching, wherein a trigger electrode is located in the ignition region of the horn spark gap, wherein a disconnecting element is provided that interrupts a connection between a trigger circuit and the trigger electrode, and thus disconnects the trigger electrode, wherein the disconnecting element is tripped or controlled by an evaluation unit that is subject to and reacts to the loading of a power follow-on current.

19 Claims, 14 Drawing Sheets

(51) Int. Cl.
  *H01H 9/46*   (2006.01)
  *H01H 85/02*  (2006.01)
  *H01H 85/165* (2006.01)
  *H01T 1/02*   (2006.01)
  *H01T 1/14*   (2006.01)
  *H01T 2/02*   (2006.01)
  *H01T 4/14*   (2006.01)

(52) U.S. Cl.
  CPC ...... *H01H 85/0241* (2013.01); *H01H 85/165* (2013.01); *H01T 1/02* (2013.01); *H01T 1/14* (2013.01); *H01T 2/02* (2013.01); *H01T 4/14* (2013.01)

(58) Field of Classification Search
  CPC .. H01H 85/44; H01T 1/02; H01T 1/14; H01T 2/02; H01T 4/14
  See application file for complete search history.

(56) References Cited

U.S. PATENT DOCUMENTS

| | | | |
|---|---|---|---|
| 9,941,691 B2 | 4/2018 | Strangfeld et al. | |
| 11,152,769 B2 | 10/2021 | Hirschmann et al. | |
| 2002/0149898 A1* | 10/2002 | Durth | H01T 4/12 361/120 |
| 2005/0041349 A1* | 2/2005 | Birkholz | H01T 4/12 361/91.1 |
| 2007/0223171 A1* | 9/2007 | Guy | H01T 1/16 361/126 |
| 2013/0208388 A1 | 8/2013 | Ehrhardt et al. | 361/137 |
| 2016/0204599 A1* | 7/2016 | Strangfeld | H02H 3/205 361/91.2 |

FOREIGN PATENT DOCUMENTS

| | | | | |
|---|---|---|---|---|
| DE | 19545505 C1 | 5/1997 | ............... | H01C 7/12 |
| DE | 102011051738 A1 | 2/2012 | ............... | H01T 1/08 |
| DE | 102011102257 A1 | 2/2012 | ............... | H01T 1/02 |
| DE | 102013112400 A1 | 6/2014 | ............... | H01T 1/02 |
| DE | 102014215282 B3 | 10/2015 | ............. | H01H 85/44 |
| DE | 102018116354 A1 | 8/2019 | ............... | H01T 1/14 |

OTHER PUBLICATIONS

Office Action (in Chinese), dated Mar. 11, 2022, issued by the China National Intellectual Property Administration for Applicant's related Chinese Patent Application No. CN201980034966.8.

Office Action (in Hindi and English), dated Dec. 8, 2021, issued by the Indian Patent Office for Applicant's related Indian Patent Application No. IN202017042875, filed Oct. 1, 2020.

Notification Concerning Transmittal of International Preliminary Report on Patentability (Chapter I of the Patent Cooperation Treaty), in English, dated Jul. 29, 2021, which was issued by the International Bureau of WIPO in Applicant's corresponding international PCT application having Serial No. PCT/EP2019/081586, filed on Nov. 18, 2019.

English translation of the International Preliminary Report on Patentability (Chapter I of the Patent Cooperation Treaty), dated Jun. 16, 2021, which was issued by the International Bureau of WIPO in Applicant's corresponding international PCT application having Serial No. PCT/EP2019/081586, filed on Nov. 18, 2019.

Written Opinion of the International Searching Authority, in English, dated Jan. 29, 2020, which was issued by the International Bureau of WIPO in Applicant's corresponding international PCT application having Serial No. PCT/EP2019/081586, filed on Nov. 18, 2019.

International Search Report, in English, dated Jan. 29, 2020, which was issued by the International Bureau of WIPO in Applicant's corresponding international PCT application having Serial No. PCT/EP2019/081586, filed on Nov. 18, 2019.

Office Action (in German), dated Nov. 13, 2023, issued by the German Patent Office for Applicant's corresponding German Patent Application No. DE102019101212.0, filed Jan. 17, 2019.

\* cited by examiner

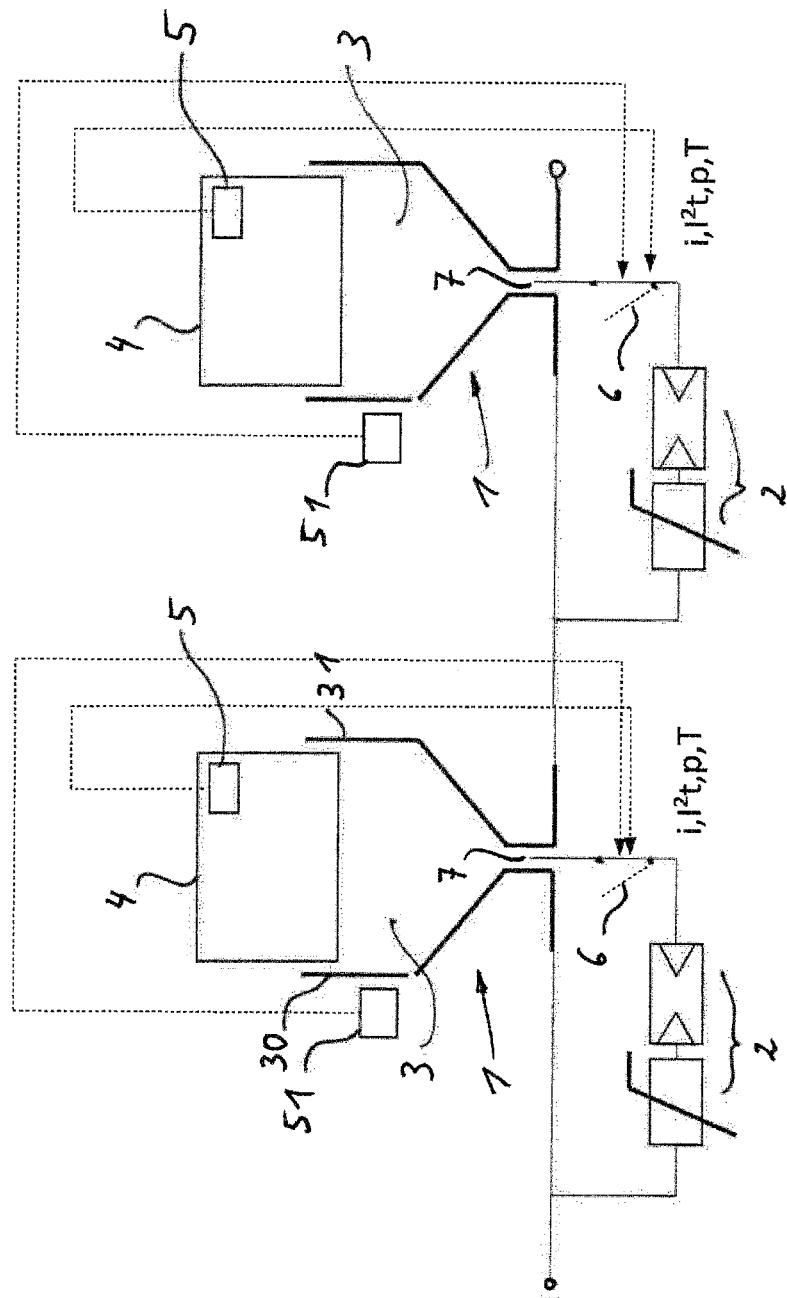

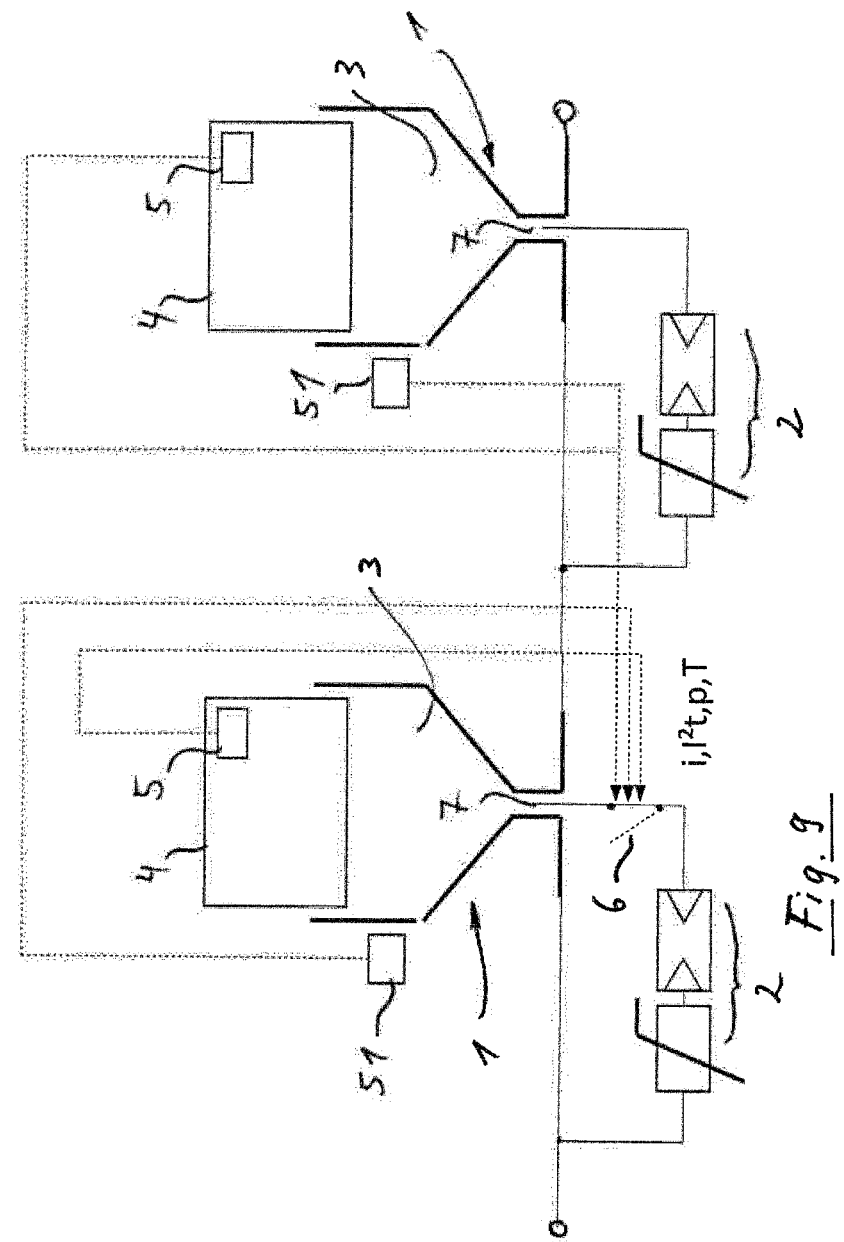

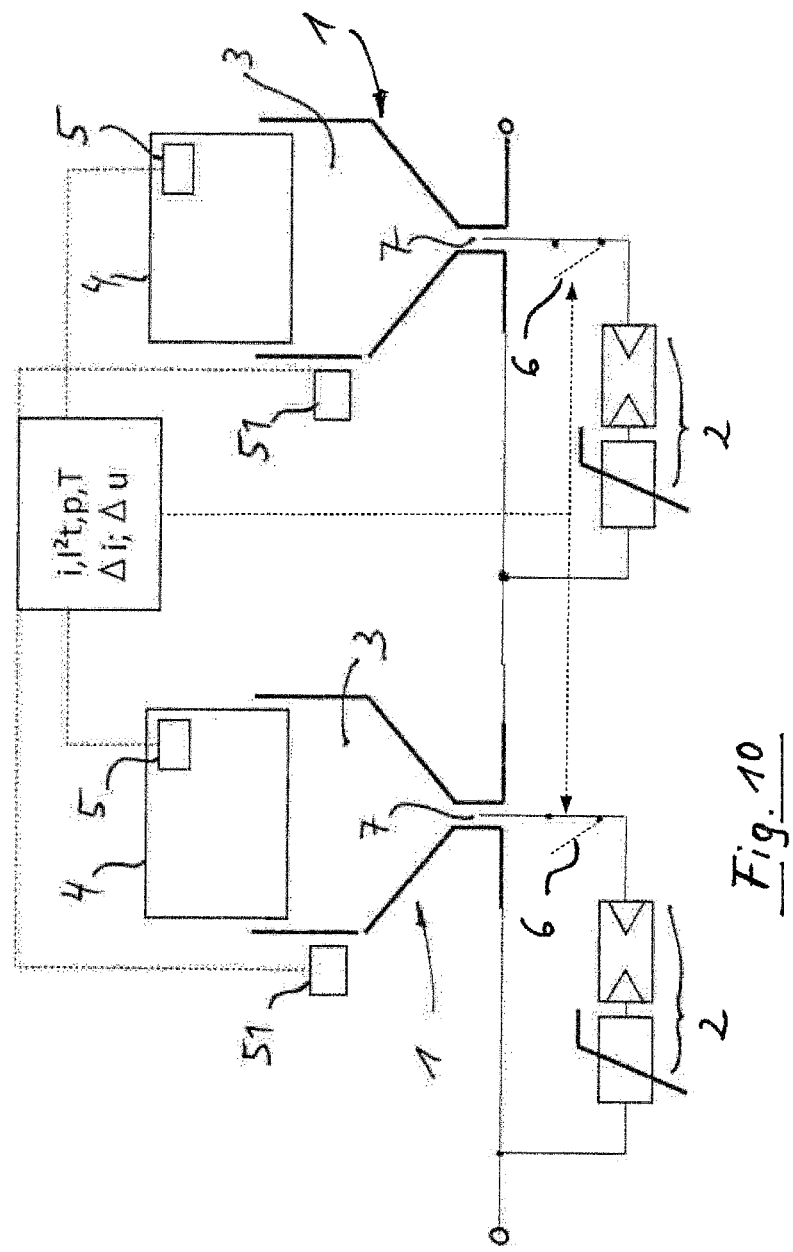

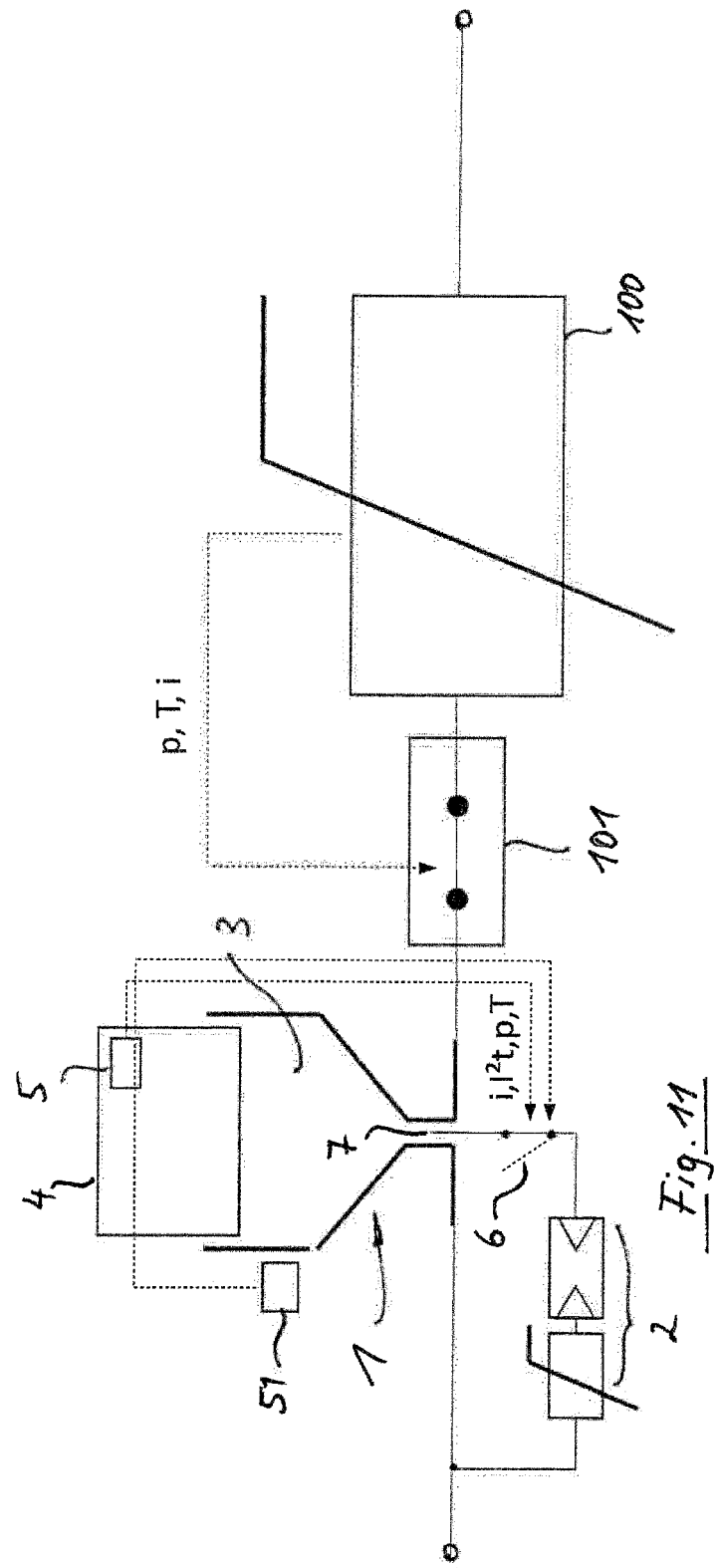

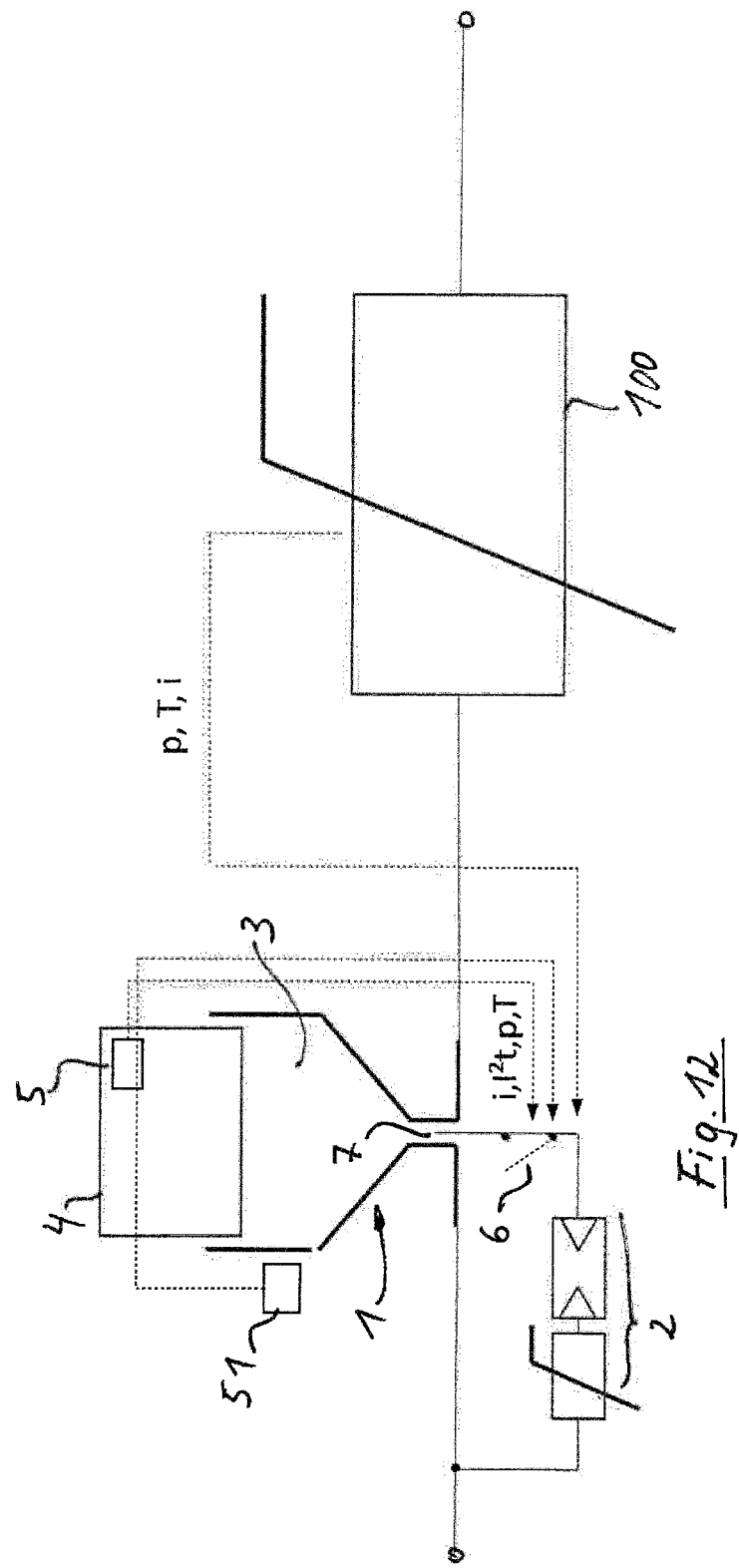

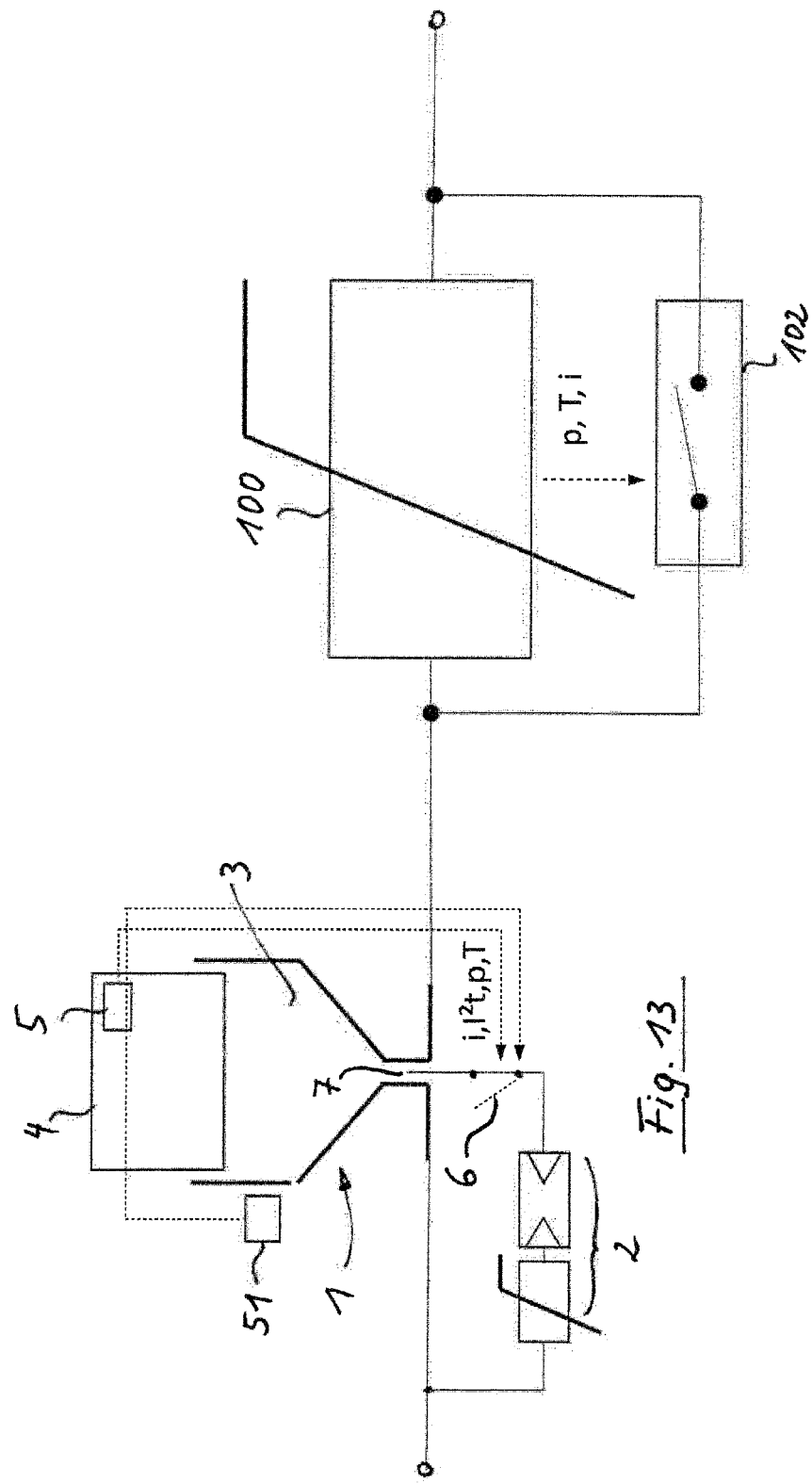

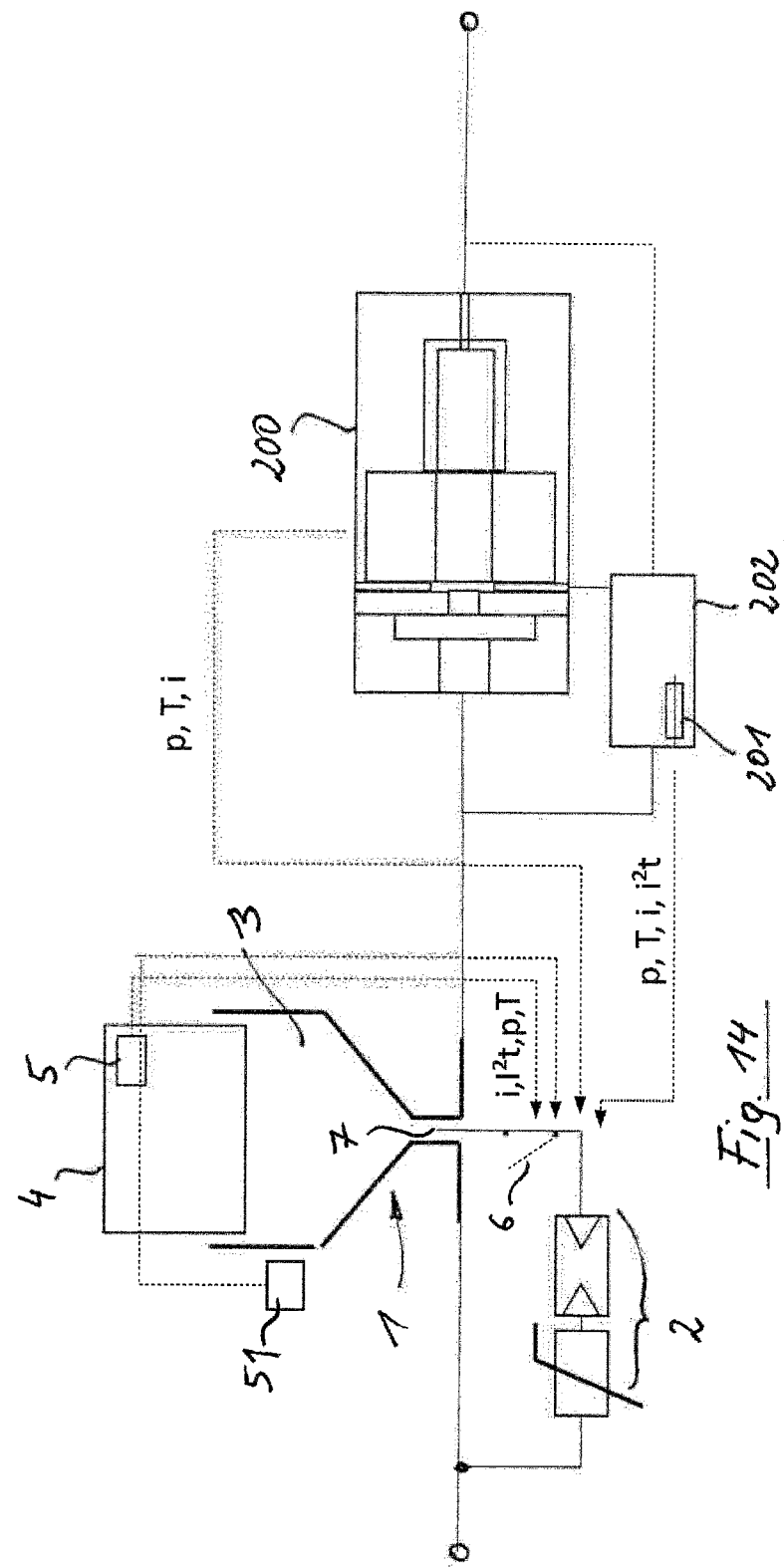

OVERVOLTAGE PROTECTION ARRANGEMENT WITH A HORN SPARK GAP, LOCATED IN A HOUSING, WITH A CHAMBER FOR ARC QUENCHING

The invention relates to an overvoltage protection arrangement comprising a horn spark gap located in a housing with a chamber for arc quenching, wherein a trigger electrode is located in the ignition region of the horn spark gap as claimed in the preamble to claim 1.

Horn spark gaps with deionization chambers for arc quenching are already known, for example, from DE 10 2011 051 738 A1. A horn spark gap for this purpose is located in a housing, and comprises means for control of the internal gas flow to set a different behavior of the arc arising in response to a surge current load on the one hand and the arc induced by the power follow-on current on the other hand.

A trigger electrode can be arranged in the ignition region of a known horn spark gap. This trigger electrode can comprise a conductive element that is surrounded by a sliding section. Adjacent sliding sections can similarly consist of an insulating or semiconductor material. The known trigger electrode is either inserted at one of the two electrodes in the ignition region, or arranged between the two electrodes of the horn spark gap, preferably in the lower region of the ignition region.

DE 195 45 505 C1 shows a surge arrestor with at least one voltage-dependent resistor, for example a varistor, and thermal switch-off devices.

These switch-off devices consist, on the one hand of a fuse strip and on the other hand of a thermal tripping with a eutectic fusible alloy.

A damage indicator is actuated with the aid of spring force when the fuse strip or the thermal release is broken. Damage that occurs is thus visible. So that, in the event of an unacceptable leakage current in the varistor arising as a result of ageing, or in the event of an excessive surge current causing a short-circuit in the varistor, an indication of the fault that has occurred can be ensured with simple means and in a space-saving manner, a housing is provided in which a fuse strip that is resistant to surge current is located. The damage indicator is a separate component, fastened detachably at the housing, and movable relative to the fuse housing after the release of a spring.

A combined overvoltage protection device with an integrated spark gap is already known from DE 10 2014 215 282 B3. The spark gap comprises a safety fuse connected in series, whereby the series circuit can be connected to a supply grid with a first potential and a second potential different therefrom. The spark gap comprises two main electrodes that are located in a housing.

The fusible link there connects a first terminal to the second main electrode of the spark gap, wherein the safety fuse still has a further contact, wherein the further contact is arranged insulated from the first contact and insulated from the second main electrode of the spark gap. The overvoltage protection device also comprises a plasma channel that leads from the combustion chamber of the spark gap into the vicinity of the fusible link in such a way that plasma can act in a targeted, degrading manner on the fuse wire. The fuse wire can as a consequence be subject to destruction.

Based on the prior art described, it is the object of the invention to indicate a more developed overvoltage protection arrangement comprising a horn spark gap located in a housing, with a chamber for arc quenching, wherein an existing trigger circuit can be switched off in a defined manner if the spark gap is overloaded, and that this can be done without the spark gap indicating incorrect function at a subsequent activation. The disconnection of the trigger circuit should preferably here be oriented to a load with power follow-on current that differs from the normal behavior of the spark gap.

The object of the invention is achieved with the combination of features as claimed in claim 1, wherein the subsidiary claims comprise at least expedient configurations and further developments.

On the basis of the overvoltage protection arrangement known per se, consisting of a horn spark gap located in a housing, with a chamber for arc quenching and a trigger electrode located in the ignition region, a special disconnecting device is present. The disconnecting device is actuated by an evaluation unit. This evaluation unit captures and evaluates the loading of the overvoltage protection device in the presence of a power follow-on current. The evaluation unit can, for example, be implemented as a fusible link. In one preferred embodiment, the fusible link is located in the region of the chamber, or is connected to it, and is exposed there to the loading of a power follow-on current.

The fusible link holds a disconnecting element, preferably supported by spring force, in a first position. On melting, the fusible link releases the disconnecting element in such a way that the disconnecting element adopts a second position, wherein, on reaching the second position, an electrical connection to the trigger electrode is interrupted, and the trigger electrode is thereby disconnected.

An idea underlying the invention is thus that of using a fusible link wire with a defined fuse integral value, in order to evaluate the loading of a spark gap that comprises an arc run region and a quenching chamber for arc quenching.

On reaching a limit value, the fusible link melts and trips the aforementioned disconnecting device, which deactivates the trigger circuit of the spark gap and possibly actuates an indicator at the same time.

The aforementioned limit value can be determined by the properties of the wire, the type of contact and the positioning of the fusible link inside the spark gap. In this way, a very accurate matching to the level and type of the loading of the spark gap is possible. The limit value should preferably be related to the loading by a power follow-on current.

The melting of the wire fusible link is, for example, brought about by current loading, a thermal loading or else by the arc losses. In one embodiment of the invention, the fusible link can also be fastened in a thermally sensitive manner.

In one configuration of the invention the trigger electrode can be connected via a voltage-limiting or voltage-switching element to one of the main electrodes of the horn spark gap, and this connection can be interrupted by means of the disconnecting element.

According to one embodiment of the invention, the fusible link is contacted in the quench chamber, for example with spaced quench plates of a deionization chamber.

The fusible link can, however, also already be arranged in the region of the inlet to the quench chamber. In particular, the fusible link or the evaluation unit can be located in the arc run region of the follow-on current arc in the horn spark gap or be connected to it.

The disconnecting element can also be tripped by a fusible link that is located in a space that is present above an ignition region of the horn spark gap.

The fusible link can also however be connected to one of the running rails or horn electrodes of the spark gap.

In one configuration of the invention, the disconnecting element is arranged laterally next to the deionization chamber and is, for example, designed as a slider.

The disconnecting element can, however, also be arranged largely within the quench chamber. Insulating bar chambers, meander chambers, or, preferably, deionization chambers can be used as quench chambers for quenching the follow-on current. The introduction of an element for disconnecting the trigger circuit is possible in a similar manner in all quench chambers. The fusible link which can, for example, be used for detection and evaluation of a follow-on current can be exposed in any quench chamber directly to the arc or also only to a flow of current resulting from a differential voltage in the chamber. The heating of the switching chamber resulting from a switching action can also be used for a thermally sensitive tripping. The non-restrictive explanations are provided below taking the example of an often-used deionization chamber, although the use of the basic arrangements can be transferred without complication to any other quench chambers.

In a further development of the invention, the fusible link is arranged without electrical potential in the arc run region or the deionization chamber.

If the fusible link is partially brought out of the deionization chamber for activation of the disconnecting element, inflow openings or inflow channels for a plasma resulting from the formation of an external arc can be formed.

In the solution presented, a disconnection of the trigger circuit from the horn spark gap with quench or deionization chamber is achieved in such a way that the spark gap is not yet irreversibly damaged after the disconnection.

If the disconnection of the trigger circuit takes place with a time delay because of the mechanical movement of the disconnecting element and the associated delay time, it is ensured that even a subsequent activation of the spark gap does not lead to a malfunction or an overload.

Through the disconnection of the trigger circuit according to the invention, and the formation of the spark gap in the ignition region, it is ensured that the response voltage of the then almost passive spark gap corresponds to at least the level of the surge withstand capacity and continuous breakdown strength usual in the field of application. The air gaps and creep distances in particular can in this case be taken into consideration in the design, bearing in mind the wear of the spark gap until the protection device responds.

In the sense of the application, disconnection implies that the surge withstand capacity and continuous breakdown strength usual in the field of application are realized. This of course not only relates to the disconnection of the trigger circuit according to the invention, but also to the requirements of the separation distance between the main electrodes of the spark gap. The air gaps and creep distances of the spark gaps are designed here such that, bearing the wear and the soiling during the intended operation in mind, and thereby not only in the new condition but also at the end of the service life, the passive response voltage of the spark gap lies above these breakdown strengths. This dimensioning is not usual for overvoltage protection devices. It is oriented towards the known design of switchgear or fuse bases or holders.

The overvoltage protection arrangement based on a triggerable spark gap according to the invention can be employed as a single spark gap or also, according to the invention, connected in series with a further spark gap or overvoltage protection device.

The adjustment of the fusible link and its positioning can be based here on the performance of the spark gap itself, on the performance of the series circuit, or also on the performance of the overvoltage protection element that is connected in series.

When the triggerable spark gap with a disconnecting device for the trigger circuit according to the invention is connected in series with further overvoltage protection devices, various possibilities for distributing the tasks for normal operation, the evaluation of an overload, and following disconnection become possible. The various possibilities will be explained in more detail below with reference to exemplary embodiments of series circuits.

In one possible embodiment for example a further overvoltage protection element such as a varistor or a spark gap can be provided that is connected electrically in series with the horn spark gap, wherein a first and a second disconnecting device is formed, and the first disconnecting device is connected to the further overvoltage protection element and, on reaching or exceeding a limiting load, enables a device that interrupts the series circuit between the further overvoltage protection element and the horn spark gap.

It is also possible that the second disconnecting device comprises the evaluation unit, wherein the evaluation unit trips or controls a switch-like disconnecting element in such a way that the disconnecting element adopts a position and on reaching this position the electrical connection to the trigger electrode is interrupted.

It is further possible that the series circuit has a low protection level and a follow-on current quenching is largely performed by the further overvoltage protection element, and that as a result the loading of the horn spark gap lies far below its maximum performance capability, and also trips the disconnection of the trigger circuit as a consequence of the overload of the further overvoltage protection element and that the fault current already flowing through the series circuit at the moment of the disconnection is securely quenched by the horn spark gap. This leads to a secure grid disconnection and to a breakdown strength developed after disconnection of the trigger circuit that is defined by the horn spark gap that corresponds to the minimum breakdown strength at the place of installation.

The tripping of the trigger circuit by the fusible link is preferably aimed at a loading that differs from normal behavior, with power follow-on current. As a criterion for this, the fundamental occurrence of follow-on current that runs at least up to the run region of the spark gap, or preferably into the quench chamber or, in addition, the exceeding of a specific current value or the specific energy of the follow-on current can be chosen.

In the case of a series circuit with a varistor, the choice can be made in the light of the occurrence of a follow-on current in the run region of the spark gap or in the quench chamber. Varistors can only carry grid-frequency follow-on currents up to a limited level and duration. The occurrence of high follow-on currents, for example of several tens or a hundred amps, indicates a faulty behavior or a risk of overload.

Varistors can, however, dissipate very high surge currents of low energy (for example 8/20 μs) and medium surge currents of higher energy (for example 10/350 μs) multiple times. Under these loads, the disconnecting device of the spark gap is not activated.

In a triggerable spark gap, however, even small surge currents that are still well below the loading capacity of varistors lead to a development of arcs, even if a power follow-on current occurs.

The fusible link used in the spark gap is able, so to speak, to distinguish light loadings from faulty loadings. If the fusible link wire is subjected to the direct action of the arc even during surge loadings, distinguishing the loading capacity can be adjusted.

The teaching of the invention aims in particular at switching off the trigger device as a result of follow-on current loading. The trigger circuit can of course also be configured to be disconnected in response to other criteria that are, for example, based on surge loadings.

Starting from the further developed horn spark gap of the invention that comprises an ignition region, an arc run region and a quench chamber, in particular a deionization chamber, it has been established that the running behavior of the arc in the case of follow-on current loading differs significantly from a surge loading. This different running behavior of the arc is used to trip the disconnecting element.

The invention is to be explained in more detail below on the basis of an exemplary embodiment with the aid of figures, in which:

FIG. 2b shows a cross section through a spark gap similar to that of FIG. 2a;

Figure 3A:
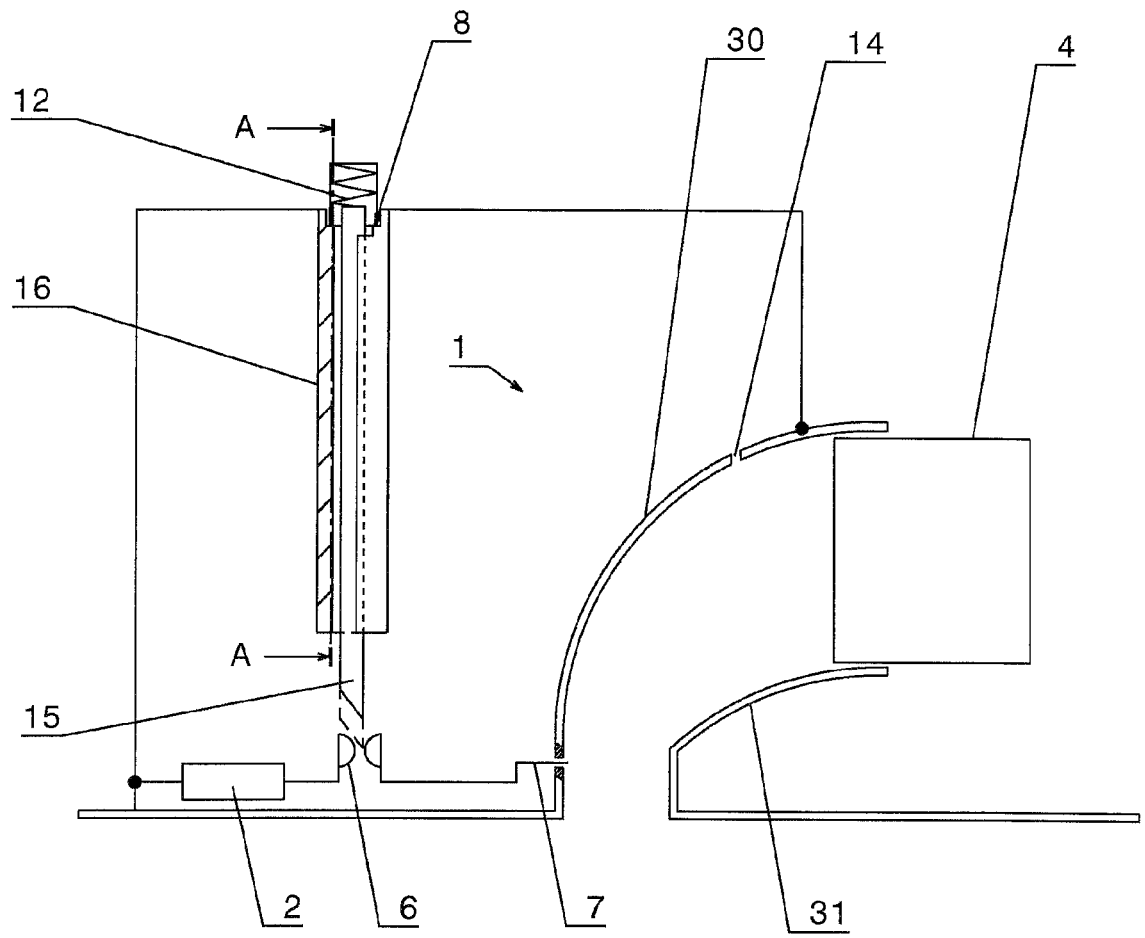
Figure 4:
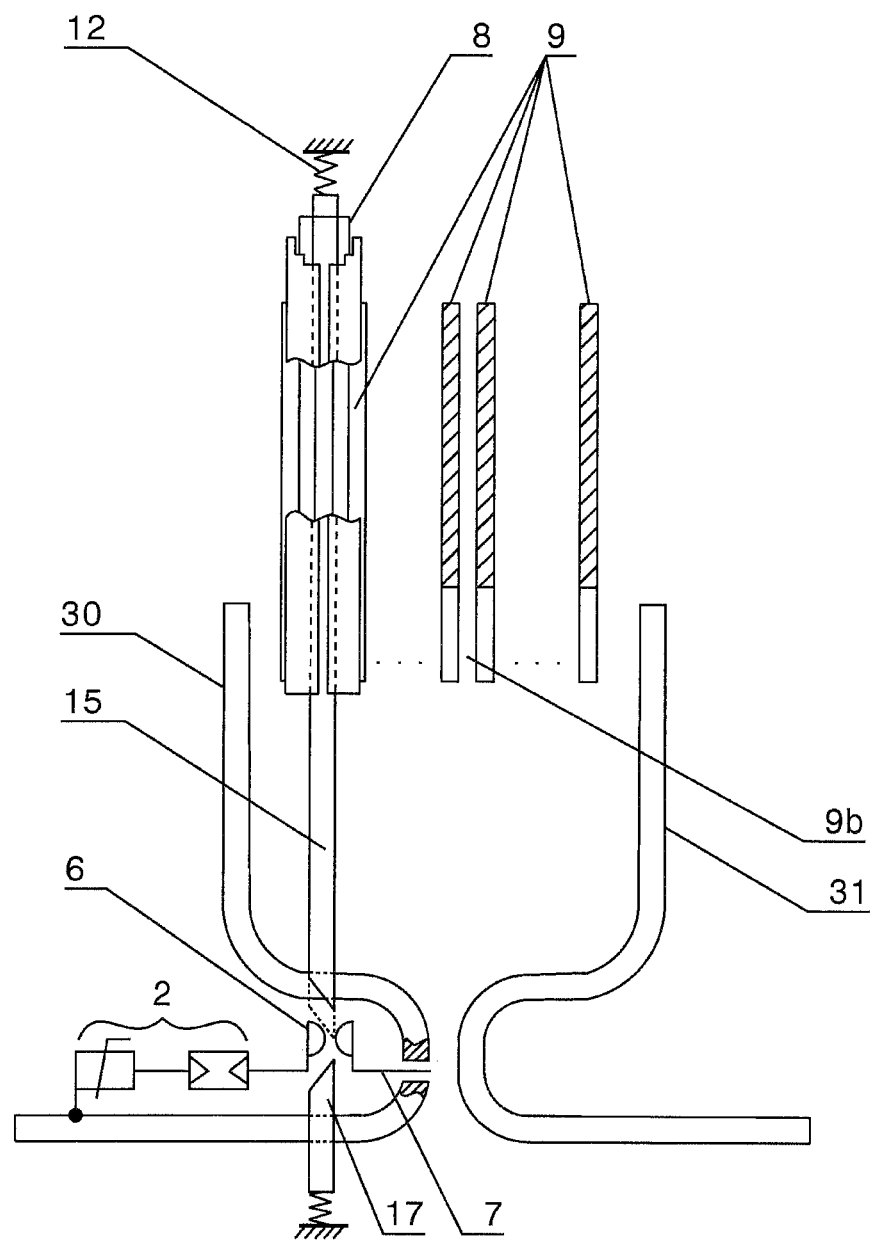
Figure 5:
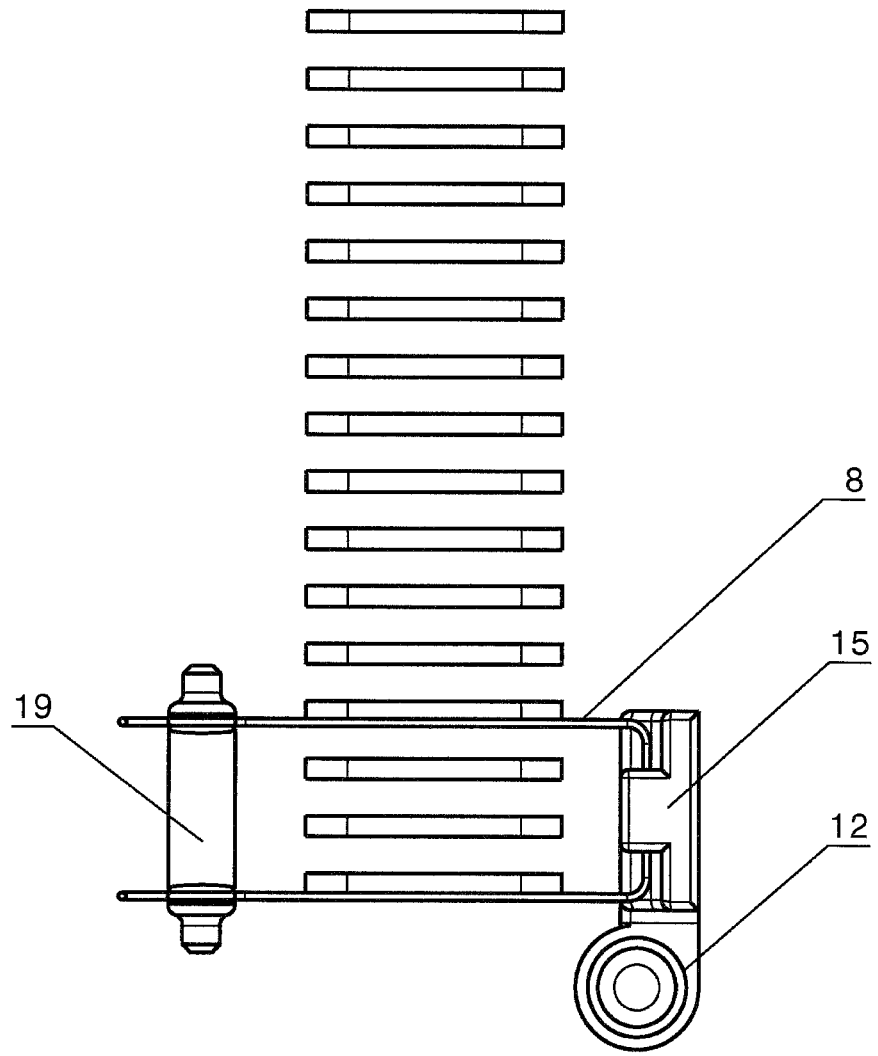
Figure 6:
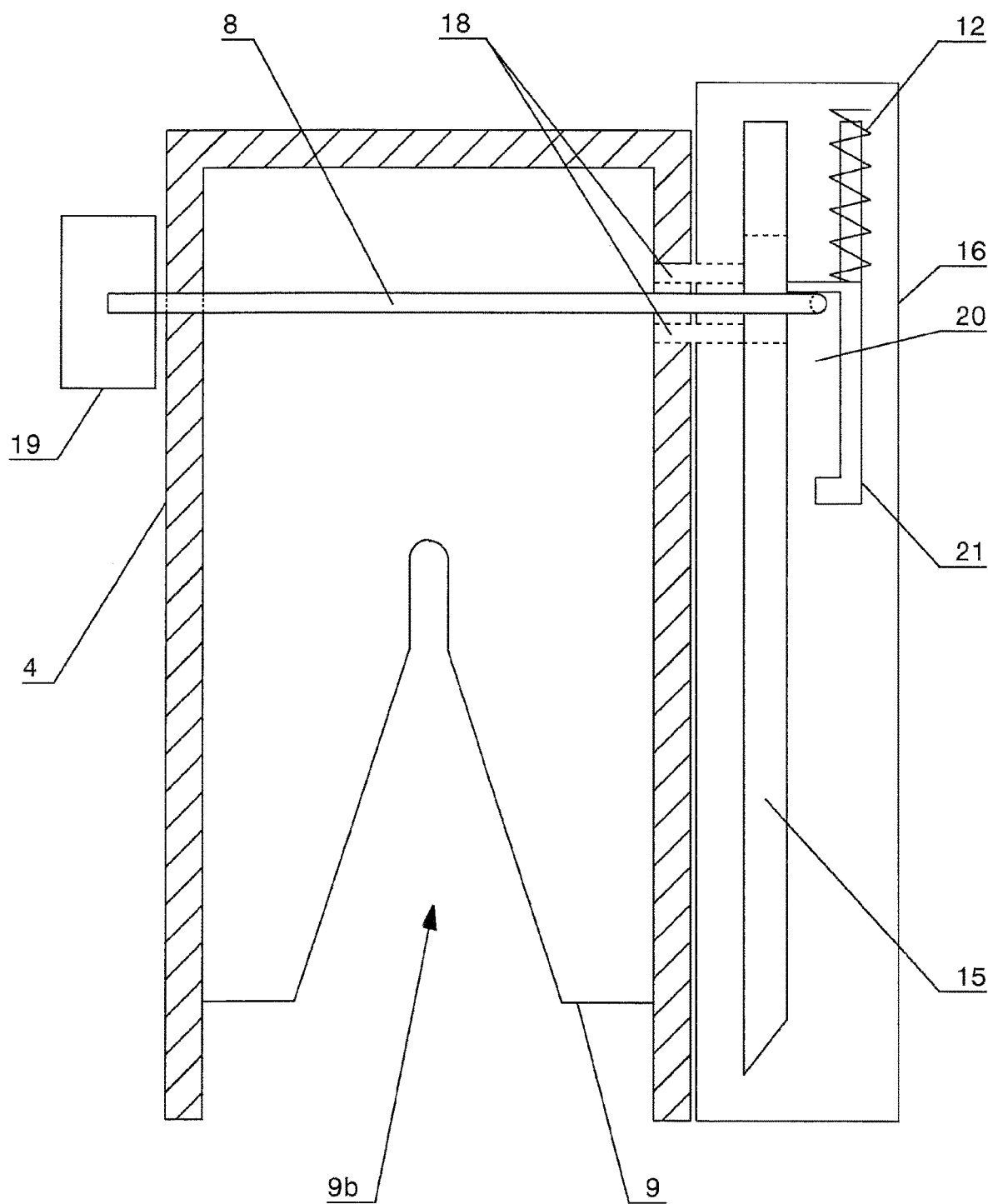
Figure 7:
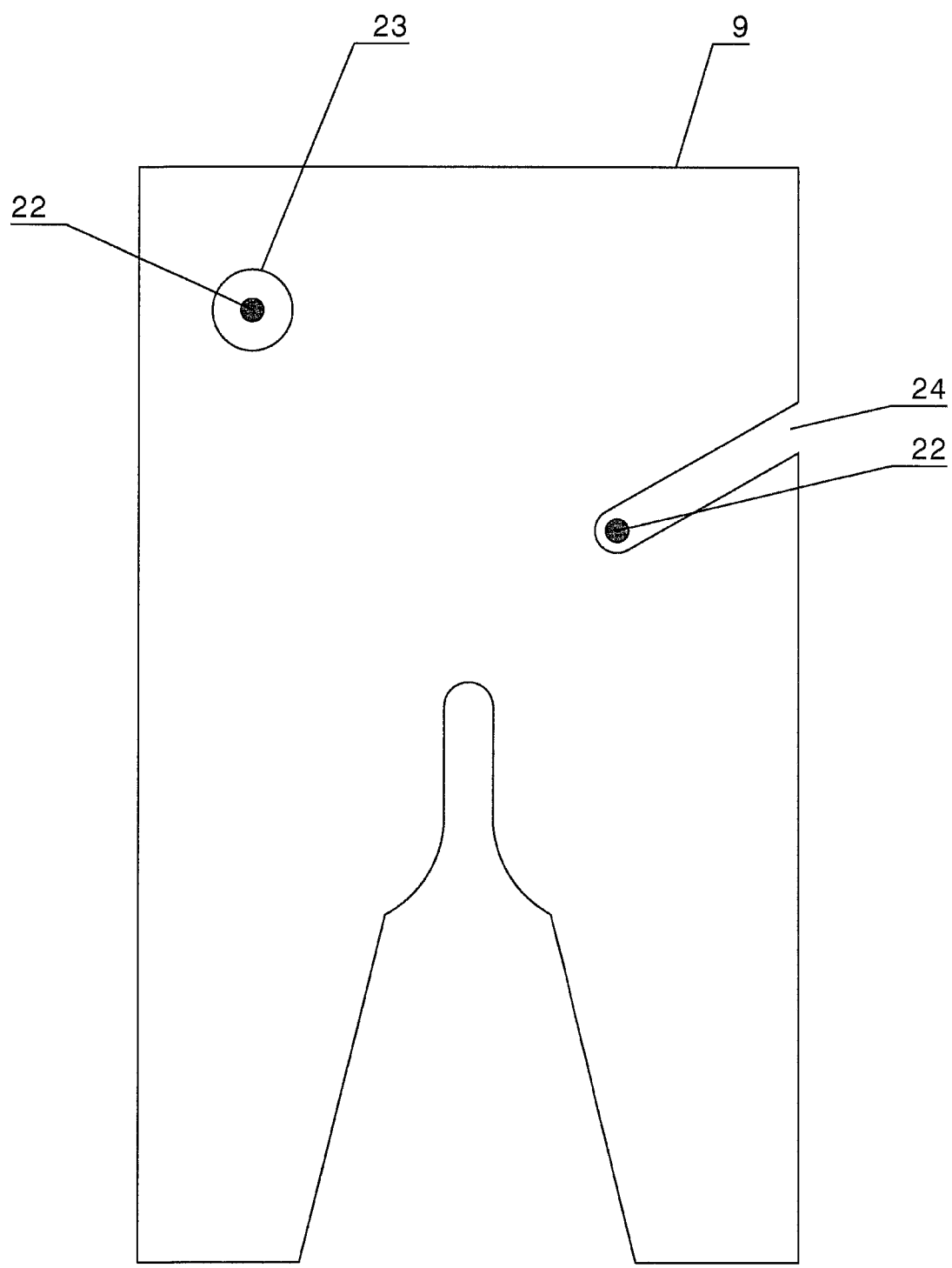

FIGS. 3a and b show views of an exemplary embodiment with interruption or insulation in one of the horn electrodes and a fusible link connected there;

FIG. 4 shows an illustration in principle of a horn spark gap with deionization chamber and quench plates, in which the fusible link is connected directly between two neighboring quench plates;

FIG. 5 shows an exemplary illustration of a horn spark gap with a plan view of the quench plates of a deionization chamber and, at the side, the disconnecting element fabricated next to the quench plates in the form of a slider under spring tension;

FIG. 6 shows an arrangement of a spark gap with fusible link and disconnecting device, in which a mechanically pre-stressed slider is provided, the fusible link fixes the pre-stressed slider, and inflow openings or inflow channels are formed for a plasma arising in the event of external arc formation, so that the plasma enters the region between the quench plates;

FIG. 7 shows an illustration of an exemplary quench plate or a deionization plate that has openings through which the fusible link or an auxiliary fusible link passes in order to improve the arc formation in the chamber;

FIG. 8 shows an exemplary illustration of a series circuit of two almost identically constructed horn spark gaps, each with an evaluation unit, wherein, on the acquisition of a faulty follow-on current, the disconnecting element, or a switching device actuate the respective trigger circuit and disconnect it;

FIG. 9 shows a further example of a series circuit of two horn spark gaps, wherein the respectively provided evaluation units act on the disconnecting element, or on the switching device of the first horn spark gap illustrated on the left;

FIG. 10 shows a series circuit of two horn spark gaps with a common evaluation unit that acts on the respective disconnecting element for disconnecting the trigger circuit of both horn spark gaps;

FIG. 11 shows a series circuit of a horn spark gap with a varistor that has its own disconnecting device, for example a thermal disconnecting device;

FIG. 12 shows a series circuit of a horn spark gap with evaluation unit and disconnecting element for interrupting the trigger circuit, wherein the disconnecting element can be activated when the varistor is overloaded;

FIG. 13 shows a series circuit of a horn spark gap of the type according to the invention with a varistor that has a short-circuit device that acts independently of the horn spark gap; and FIG. 14 shows a series circuit of the horn spark gap of the invention with a spark gap based on a functioning principle different from that of a horn spark gap, for example using a hard gas discharge.

Figure 1:
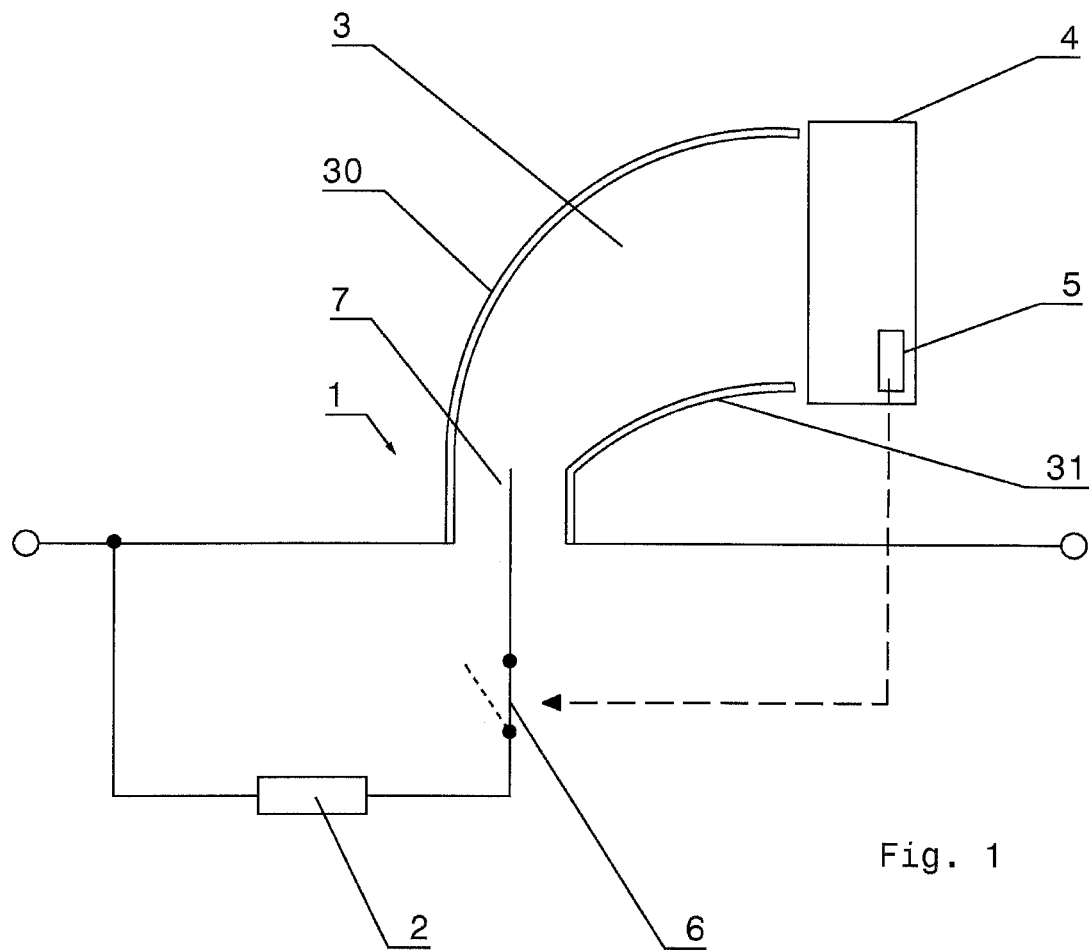
FIG. 1 shows an exemplary arrangement with a horn spark gap, trigger circuit, arc run region and quench or deionization chamber in addition to the evaluation unit of the invention based on a fusible link.

The overvoltage protection arrangement according to FIG. 1 assumes a spark gap 1 that has a trigger circuit 2. The spark gap has two bow-shaped horn electrodes 30, 31, illustrated in a stylized manner, that enclose an arc run region 3. An ignition or auxiliary electrode 7 is located in the foot region of the horn electrodes 30, 31, and is connected to the trigger circuit 2.

A disconnecting element 6, for example designed as a switch, can interrupt the connection between the ignition electrode or auxiliary electrode 7 and the trigger circuit 2.

A deionization or quench chamber 4 is adjacent to the arc run region 3, and accommodates a plurality of deionization or quench plates (not shown).

An evaluation unit 5 is located in the region of the deionization chamber 4.

This evaluation unit 5 consists of a fusible link in the form of a wire. If the fusible link is overloaded, an activation of the disconnecting element or of the switch 6 to interrupt the trigger circuit occurs, symbolized by the arrow on the illustration.

The fusible link, not shown in FIG. 1, as a significant component of the evaluation unit 5, is preferably arranged in the deionization chamber 4 of the spark gap 1.

The spark gap 1 is implemented here in such a way that brief surge currents do not enter into the deionization chamber 4, and that entry in the case of longer surge currents is only possible under specific conditions, or depending on the current.

Follow-on currents, because of the support of their own magnetic field, for example through concentrator plates (not shown), even at very low current values of less than 10 A, reach the deionization chamber 4 within a few milliseconds.

FIG. 2 shows a development of the arrangement of fusible links 8; 81 on the basis of the principle described in relation to FIG. 1.

Accordingly, a spark gap 1 with horn electrodes 30; 31 is again assumed, wherein the trigger circuit 2 already explained, which can be disconnected by a switch device 6, is present between an outer electrical connection and the ignition electrode 7.

A fusible link 81 as a release wire is located inside a deionization chamber 4 (see FIG. 1), wherein the deionization chamber comprises the quench plates 9 with an inlet region 9b and an outlet region 9a.

The space that usually has surge arcs is indicated with reference sign 10. The arc run region of the follow-on current arc is indicated with reference sign 13.

The electrodes 30 and 31 are divergent, and the aforementioned space 10 is located above the ignition region in which the surge arcs lead to stronger ionization and thermal stress on the spark gap.

If the fusible link 8 is placed in this volume, dimensioning is required that does not lead to tripping as a result of multiple surge currents in the rated range. The tripping should only then take place with surge currents above the rated range, or by power follow-on currents. The fusible link 8 is, for example, extended according to FIG. 2 between the running rails or horn electrodes 30, 31 of the spark gap 1, and provided with insulation 11 on at least one side. The mechanical pre-stressing of the fusible link or release wire 8 is provided by a spring 12 that is located outside the arc region.

The tripping of the fusible link in this range is in particular possible with low-energy surges that occur in combination with varistors. In the case of high-energy surge currents and power follow-on currents occurring during operation in a simple spark gap, the design is more difficult, so that additional measures for protection of the wire may have to be provided. Preference is therefore given to positioning the fusible link in accordance with reference sign 81.

Between the horn electrodes 30; 31, the region 13 inside the spark gap 1 is adjacent to the region 10. Only arcs that move along the running rails, which is to say the electrodes, reach into this region of the spark gap. In accordance with the preceding explanations, an arc only enters the region 13 in the case of power follow-on currents.

On entry of the arc into the region 9b, the fusible link 81 is captured by the arc, as a result of which it melts and actuates the disconnecting element or the switch 6. A flow of current through the fusible link 81 can deliberately support the overloading of the link, but is not, however, essential.

Figure 2A:
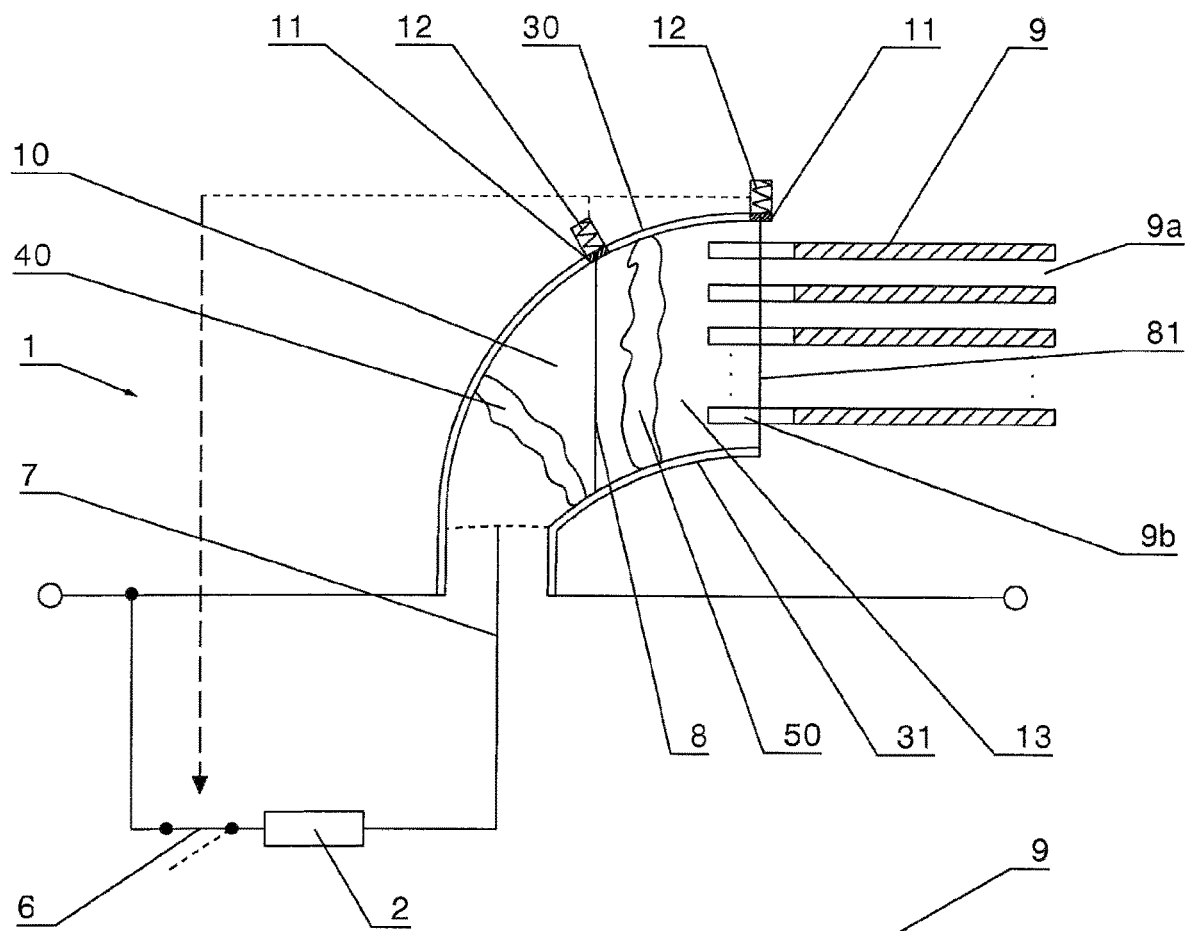
FIG. 2a shows a development of the solution illustrated in FIG. 1 with a fusible link in the inlet region to the deionization chamber as well as a further fusible link in the space above the ignition region.
Figure 2B:
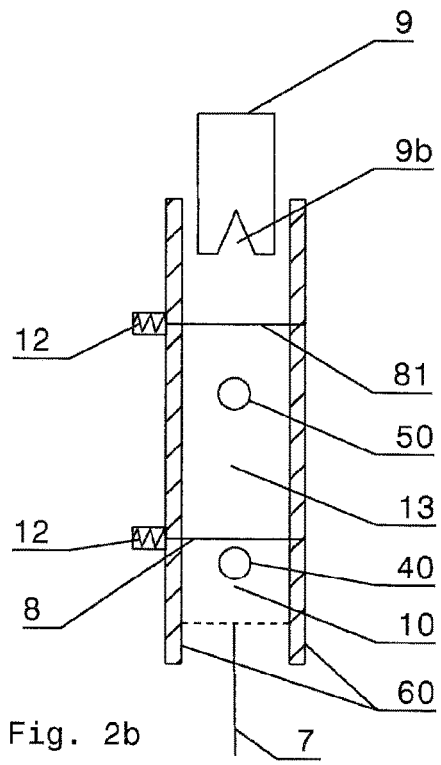

The illustrated arrangement according to FIG. 2a or 2b can also be used with quench chambers in the form of meander chambers or insulating bar chambers.

The position of an arc 40 in the region 10 and of an arc 50 in the region 13 is illustrated in FIGS. 2a and 2b by way of example.

The deionization plates 9 according to FIG. 2b have an inlet region 9b that starts in the space 13.

The fuse wire 81 is here held insulated in a running rail, and prestressed by the spring 12.

The insulation of the fusible link 81 with respect to the running rail can, in addition to avoiding a short circuit, also perform the function of a voltage-switching element, so that a safety function results. If the applied voltage for example exceeds the designated protection level of the arrestor, switching off can be tripped.

Alternatively, there is also the possibility of fastening the fusible link 8; 81 in an insulated manner at both ends with respect to the horn electrodes 30, 31. On entry of the arc this is then subject to the thermal effect of said arc. In FIG. 2b the wire 81 is for example only brought close to the inlet region 9b of the deionization chamber between the running rails or the electrodes of the spark gap 1.

FIG. 2b shows a cross section through the horn spark gap with the regions 10 and 13 and the quench plates 9 of the deionization chamber. FIG. 2b shows here a positioning of the fusible link 8 or 81 transversely with respect to the deionization chamber with a lateral connection with respect to the bounding walls 60 of the arc run region and mechanical pre-tensioning 12.

In accordance with the explanations with regard to FIGS. 2a and 2b, the fusible link 8; 81, or parts thereof, is always directly exposed to the arc, or however at least to the follow-on current arc. This is not critical for the purpose of distinguishing between follow-on current and surge current. Ageing must, however, be taken into consideration if there are multiple follow-on current loadings. It is possible to arrange the fusible link in such a way that the overload is essentially only reached through the flow of current through the fusible link, and not through the effect of the arc.

In addition to direct contact of the wire 81 in the run region 13 or in the inlet region to the deionization chamber, an interruption in the running rail or in the horn electrode, or a contact introduced with insulation, can also be used so that a fusible link is only loaded in the event of a follow-on current and a certain running distance.

An arrangement of, in principle, this type is shown by way of example in FIG. 3a/3b.

An interruption 14 or an insulation is inserted for this purpose into a horn electrode 30. It is also, however, possible to provide an insulated contact at or in the horn electrode. The region of the contact lies above the volume 10, and thus in the region 13 (see FIG. 2a), or is close next to the deionization chamber 4.

In the region or space 13, the follow-on current that occurs is only very little reduced, which is advantageous.

Figure 3B:
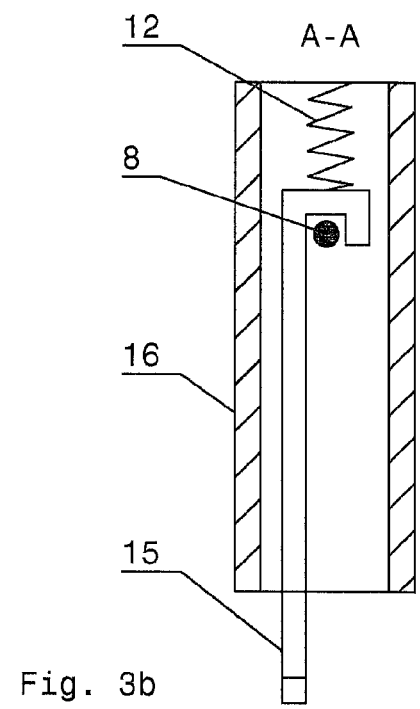

A slider 15 shown in FIGS. 3a and 3b is fastened to the fusible link 8 with spring pre-tensioning, and is routed by a slide arrangement 16. The slider 15 opens when the switch 6 is tripped, and interrupts the trigger device 2 of the spark gap 1.

The side view of FIG. 3b shows an exemplary fastening of the slider 15 to the wire 8.

The actuation of the switch can also take place by means of a released firing pin or the like. The switch 6 can also be locked.

Trigger circuits arranged at the side next to the deionization chamber have the advantage of a low space requirement and a low parts count, and do not require a change in force or in the effective direction. The fusible link must be appropriately routed in this respect.

Any unfavorable loading conditions of the fusible link can be overcome through the options for adjusting the release behavior.

In one configuration, the fusible link can be contacted directly by quench plates inside the deionization chamber and bridge at least two quench plates, whereby, on contact between the arc and the corresponding quench plates, at least a partial current or even a full current flows through the fusible link.

A basic arrangement embodying this principle is illustrated in FIG. 4.

The disconnecting device 6 of the trigger circuit, which is designed as a switch, can, for example, be designed as a clamping contact that is interrupted by a slider 15 that is under spring force 12 when the fusible link 8 is tripped.

The slider 15 here is under sufficient initial stress to overcome the contact force of the contacts of the switch 6.

The slider 15 is guided in the manner of a slide, and moves as an insulating piece into the contact region, so that the required minimum breakdown strength in the application field next to the spark gap is also maintained by the open switch 6 of the trigger circuit.

FIG. 4 also shows a further slider 17 that can for example react to the trigger criterion of surge loading or the loading of a component connected in series.

This slider 17 can interrupt the trigger circuit independently of the state of the fuse wire 8.

The fuse wire 8 can, in addition to current loading, react to a thermal or pressure loading, so that various criteria of the loading of the spark gap or of a device connected in series for disconnecting the trigger circuit can be employed.

FIG. 5 shows an illustration of an exemplary lateral fastening of a slider 15 to the fusible link 8 and its routing and contact at the deionization plates of the deionization chamber.

In the illustrated case, the contact takes place between four plates, so that if the arc is distributed in the quench chamber the fusible link is loaded with a voltage of about 60 V, as a result of which a current loading arises for the fusible link depending on the resistance.

At low values, the whole of the current can be fully carried by the wire, while at higher current values the current is divided as the arc enters and after the division of the arc. The highest current loading on the wire here results very briefly before the division into partial arcs, since a certain increase in the arc voltage is necessary for this process. In the case of insulating bar chambers or meander chambers, this brief increase in the arc voltage does not, of course, occur, and does not have to be taken into consideration additionally in the design of the fusible link.

If the illustrated arrangement is to be dimensioned for a multiple follow-on current loading, the fuse wire must not be overloaded as early as this division phase, but, for example, only when arcs remain for a long time in the quench chamber with the associated current distribution on the fusible link as well as the heating of the quench plates.

If the resistance of the fusible link wire is about 100 mΩ, the division of the current already takes place significantly below 1 kA, as a result of which the quenching capacity of the deionization chamber is scarcely impaired.

The current, or the partial current, here brings about a melting or a deformation of the fusible link, as a result of which tripping the switch for disconnecting the trigger circuit is possible.

In addition to directly contacting the quench or deionization plates, arrangements are also possible in which the fusible link is only loaded after the arc reaches specific positions in the quench chamber.

An interruption of at least one quench plate below the contact is possible for this purpose. Similarly at least one fusible link wire end can be inserted rather like a potential probe between two deionization plates. The fusible link can in addition be minimally insulated from a deionization plate.

Variants presented above only allow a flow of current when there is sufficient ionization or direct contact in this region. An embodiment of this type is in particular advantageous when the distances between the arc ignition region and the deionization plates are small, since in this way a flow of current can also be avoided in the case of large surge currents that can already ionize the space right up to the deionization plates.

According to the illustration of FIG. 5, routing the fusible link 8 laterally with corresponding contact to the quench plates is preferred, wherein, however, an axial choice of the pre-tensioning is in principle also possible.

The lateral routing of the fusible link, in addition to radial loading, is therefore particularly advantageous, since in many cases the trigger circuit for the spark gap is arranged laterally next to the spark gap, and thus is located in the active direction.

In the case of direct contact, and thereby bridging between quench plates, it must be borne in mind that with a low resistance of the fusible link wire, in particular at low currents, it may not be possible in some circumstances for an arc to form between the bridged quench plates, since the voltage drop across the fusible link is too small. It is thus possible that the fusible link reduces the current limitation. For this reason, the number of bridged quench plates should be kept low.

If the fusible link is partially brought outside the deionization chamber to realize mechanical fastening functions with regard to the spring-tensioned disconnecting element designed, for example, as a slider, it must be borne in mind that with a complete commutation of the current on the fusible link, an arc can arise outside the arc burning chamber or the deionization chamber, and it can in particular occur in the region of the mechanical loading of the fusible link.

So that the arc outside the arc chamber does not result in damage to or bridging of the chamber, additional measures can encourage ignition of partial arcs between the bridged plates, in particular in the case of deionization chambers. Gas channels can for this purpose be brought out of the region of the fusible link routing between the quench plates, so that in the event of external arc formation, plasma can enter between the quench plates.

An embodiment of this principle is shown in FIG. 6.

Entry openings or inflow channels 18 are present according to the illustration there. In the region of the mechanical fastening of the slider shown there, the fuse wire 8 is fastened outside the deionization chamber 4, stressed by a spring force 12 radial to its routing and fastened at the guide piece 19. In the case of a non-adiabatic loading, this can in some circumstances lead to a mechanical expansion that brings about the formation of an arc in the region of the expansion 20. The region 20 can be partitioned by a covering piece 21, as a result of which arising plasma can be guided through the openings 18 between the deionization plates 9. This supports the arc formation in this region even at low currents.

There is furthermore the possibility of designing parts of the fusible link wire 8 and of routing it between the plates in such a way that a formation of arcs occurs directly between the plates 9. This is, for example, possible by means of narrow locations on the fusible link or by openings in the form of holes or slots in the deionization plates 9, through which the fusible link wire, or a further auxiliary wire 22 that melts subsequently, is routed.

A development of the invention of this type is shown in FIG. 7 with exemplary openings 23 and 24 in a deionization plate 9.

The ignition of an arc in the deionization chamber can also occur in that if an arc forms at the fuse wire outside the arc chamber, the arc reignites between the first contacted deionization plate and a relatively nearby horn electrode, and the arc in the region of the bridged plate again enters into the chamber. This is in particular possible if plates are bridged at an edge of the chamber, since as a result the arc voltage is lowered very little or only very briefly by the re-ignition.

Through the impedance of the bypass of at least partial regions of the arc chamber, in addition to an adjustment of the current distribution, there is also a voltage control that occurs through the required arc voltage and the voltage drop across the impedance. This depends on the current in the same way as the impedance itself.

The explanations regarding adjustment of the impedance through the wire material, the contact and the geometry of the wire, i.e. the fusible link, as well as the voltage loading through the number of bridged plates are only to be viewed as exemplary explanations. Here again of course, discrete components with linear or non-linear behavior can also be used as supports for controlling the level or time of the loading. Voltage-limiting or voltage-switching elements can similarly be used for control of the fuse wire loading in the place of a voltage tap as a consequence of bridging a different number of quench plates, without changing the basic idea of the invention.

The arrangement according to FIGS. 4 to 7 is in particular suitable for evaluating the mains current behavior in terms of the time duration, level and also the fuse integral. These embodiments are therefore particularly suitable for individually triggerable spark gaps as well as for their series connection.

If merely the occurrence of a follow-on current of a relatively low level is sufficient as a fault criterion, implementations according to FIGS. 2 and 3 can be used.

This is, for example, the case with an arrangement consisting of a series connection of a varistor with a triggerable spark gap. In this case the entry of a power follow-on current into the quench chamber, i.e. the differentiation from surge current, can already be used as an adequate trip criterion, whereby the $I^2t$ value of the fusible link can be kept very small.

If with a series connection of spark gaps, or with a single spark gap, a risk of overload is detected, it is necessary to distinguish a faulty follow-on current behavior from a follow-on current behavior under normal function in reliable operation or power range.

In terms of its normal quenching behavior with follow-on current, the spark gap has a maximum occurring quench integral, which generally occurs at the maximum permissible operating voltage and maximum permissible expected short-circuit current of the grid. This known value is used, inter alia, to designate the selectivity to a minimum pre-fuse in the longitudinal branch. In general, an additional safety factor is taken into consideration between the two values.

If there is a risk that the above-mentioned value can be reached or even exceeded, it is necessary to disconnect the spark gap. The loading of the fusible link is therefore dimensioned such that tripping occurs on exceeding the current limiting integral of the arrestor.

It should be noted that this limit value must not be set equal to the performance of the spark gap. The spark gap is in principle capable of reliably quenching this and even higher loads multiple times. For example, the quench plates in the deionization chamber are dimensioned such that only at integrals with about two or three times the value does the temperature of the plates briefly reach the melting temperature of the adjacent insulation material of the housing or other supporting body.

The desired trip behavior of the fusible link can be influenced by the material, in the sense of the resistance value of the cross section and so on. With a high specific resistance, or an increase in the resistance of the current loading, it is advantageous that the voltage that drives the current through the wire has a certain level so that the current cannot be reduced to an uncritical value through the resistance increase with positive temperature gradients.

The voltage between two deionization plates depends, within certain limits, on the material, the current and the cooling. In an unfavorable case, the voltage can fall below 20 V. In order to reliably induce overloading for the fusible link under such circumstances, the contact between multiple deionization plates is possible, whereby the driving voltage can be increased to a multiple level.

Nevertheless, materials with low temperature dependency or negative temperature gradients in terms of the resistance value can also be employed.

The fusible link wire itself can be clamped, welded or soldered to the plates for contact.

Individual contacts additionally allow for thermal tripping, which can be coupled to the total loading of the spark gap.

Such a thermal trip can be brought about with a state change of the fusible link 6, for example in the sense of an expansion or shortening.

In addition to the use of fusible link wires that are overloaded by the flow of current or which can be thermally tripped, materials that undergo a change in shape can also be used. Materials based on a shape-memory alloy can be overloaded both adiabatically, for example like wires, but however have the advantage that, for example, even small currents can be enough to generate sufficient tensile forces. The fusible link wire can be mechanically prestressed in an axial direction or also in a radial direction. Wires with a diameter of 200 μm can permanently maintain tensile forces of several newtons, which can be used to actuate the disconnecting device or the switch.

When not separately explained, the same reference signs are used for the same technical means and elements in FIGS. 8 to 14, explained below, as were already introduced and employed for description in the context of FIGS. 1 to 7.

With the aid of FIGS. 8 to 14, an explanation is to be given as to how, using the principle of the invention of using an evaluation unit for the disconnection of a trigger circuit, the series connection with a further arrestor can be implemented. It is fundamentally possible here that, when the further overvoltage protection element of the series circuit or of the triggerable spark gap is overloaded, at least the trigger circuit of the spark gap is deactivated.

Series connections of a triggerable spark gap with a further overvoltage protection element have a low protection level, for example at a mains voltage of 275 V-1.5 kV. The necessary follow-on current suppression or follow-on current quenching is preferably realized exclusively or predominantly by the further overvoltage protection element. The loading of the triggerable spark gap during normal function of the series circuit lies significantly below its performance capability. The series circuits according to the embodiments of FIGS. 11-14 largely correspond to this "single-ended" task distribution in the follow-on current suppression.

A disconnection of the trigger circuit takes place with a thermal or dynamic overload of the further overvoltage protection element, for example as a result of ageing or temporary overvoltages, or else in the event of a loading that differs from normal loading.

The fault current, which at the time of the disconnection may already be flowing through the series circuit, is securely interrupted by the now no longer triggerable spark gap, independently of the state of the further overvoltage protection element. After this last interruption, so to speak, the arrangement is securely disconnected from the grid with a high minimum breakdown strength.

After the disconnection of the trigger circuit of the spark gap, the spark gap has a breakdown strength that corresponds to the minimum breakdown strength corresponding to the place of installation, for example 2.5, 4 or 6 kV. Suitable creep distances and air gaps, which are not sensitive to soiling or electrode burn-off, are realized here.

FIG. 8 on the other hand shows the series connection of two horn spark gaps according to the invention with switch-like disconnecting element 6, trigger circuit 2, the horn electrodes 30 and 31, the trigger electrode 7 and a first evaluation unit 50 that is arranged in the region of a chamber 4 for arc quenching, as well as a second evaluation unit 51 that responds to energetic processes in the arc run region.

On the acquisition of a faulty follow-on current, the switch 6 for the respective trigger circuit 2 is actuated, and the trigger circuit 2 is disconnected from the trigger electrode 7. The evaluation units can correspond to those already explained for FIG. 2, 3 or 4, and are preferably implemented in such a way that they respond exclusively to the occurrence or the level or the energy of a follow-on current, and thereby evaluate the follow-on current.

The disconnecting element 6 can be realized with the single slider or else the double slider solution as already explained. The tripping of the slider or the disconnecting element 6 can also occur in accordance with "and/or" combinational logic depending on pressure, temperature or in relation to a melting integral.

A series connection of two equivalent spark gaps according to the invention with a corresponding disconnecting device is of course possible. Here, however, an equal loading of the spark gaps occurs, including in the event of follow-on current, and equal ageing. On reaching the load limit of a spark gap, its evaluation unit 5 or 51 activates, and realizes the disconnection of the series circuit. A forced actuation of the disconnecting device of the second spark gap is not provided. The demands on the desired disconnection function are thus in each case only met by the first spark gap to respond. Saving one evaluation unit and one disconnection device is, in principle, possible with a spark gap of such a series circuit in that the one spark gap is over-dimensioned in respect of its follow-on current behavior or performance capability. In this case, only the spark gap that is more heavily loaded in relation to its performance needs an evaluation and disconnection.

FIG. 9 also shows a series connection of two horn spark gaps 1, wherein here the evaluation units 5; 51 of the second spark gap (shown on the right) act on the disconnecting element 6 of the trigger circuit 2 of the first spark gap (on the left).

The action of the evaluation units of the second spark gap without disconnecting device on the disconnecting device of the first spark gap also allows one disconnecting device to be saved, and does not require the over-dimensioning or a changed follow-on current behavior of the second spark gap. Through this, an equal participation of the spark gaps in the quenching of the follow-on current can be enabled, whereby the performance of the arrangement under normal operation can be increased. An additional modification to parts of the second spark gap to change the performance can thus be omitted.

FIG. 10 again shows a series connection of two horn spark gaps 1 with a common evaluation unit 5; 51, which acts on the respective disconnecting element 6 of the respective spark gap 1.

Such a design is in particular useful with an equal working distribution of the spark gaps, which is to say for the case in which both spark gaps together quench the follow-on current, and both spark gaps, as a series connection, ensure the desired breakdown or insulation strength after disconnection of the trigger circuits.

The forced actuation of both disconnecting devices of the two spark gaps of the series connection not only enables a distribution of the loading between the spark gaps when switching off the follow-on current, but also a distribution of the requirement of the necessary breakdown strength for the disconnecting device and the dimensioning of the "passive" spark gaps.

With such an arrangement what is known as a bridge circuit can, for example, also be used for deriving the actuation criterion, which ascertains a longer skew load between the desired proportional voltage build-up of the single spark gap for quenching the follow-on current. The desired current or voltage distribution can for this purpose also be controlled directly through suitable sensors.

In addition to the direct use of such variations, electronic acquisition units can also be employed for indirect use. Exemplary bridge circuits for evaluation of surge arrestors connected in series are known to the expert, and can be adapted without difficulty for the corresponding application.

FIG. 11 shows a series connection of a horn spark gap 1 with a varistor 100 that has, for example, a thermal disconnection device 101.

In this simple series circuit, even very small follow-on currents can be used to activate the disconnecting device of the spark gap, whereby the requirements of the evaluation unit(s) 5 or 51 are very small. In the event of damage, overload or destruction of the varistor, which lead to an "immediate" follow-on current, the activation of the disconnection device of the spark gap is therefore ensured. Simple thermal disconnection devices however also have disadvantages that must be taken into account with this simple series circuit. The delay of a thermal disconnection device is sometimes considerable. In the case of loads that strongly heat the varistor but that nevertheless do not immediately lead to an increased follow-on current, the thermal disconnection device 101 can be tripped without it being possible for the disconnecting device 6 of the trigger circuit to be actuated due to the full-on current not occurring. So that even in such a case the series circuit meets the demand in respect of the desired high breakdown strength, the disconnecting device 101 of the varistor must be designed such that it can satisfy these demands at least without the formation of an arc when opening. Appropriate air gaps and creep distances are to be provided for this purpose. These requirements can be met with appropriately long stroke distances, or also with disconnecting sliders. If soldered locations are used, the formation of solder tails etc. is to be avoided or taken into account.

As a result of what may be a considerable additional outlay or space requirement for such a special disconnecting device, it can therefore be advantageous to entirely avoid an independent disconnecting device of the varistor.

FIG. 12 shows a series connection of a horn spark gap with a varistor 100, wherein different overload criteria do not act on a varistor-specific, separate disconnecting device, but actuate the disconnecting element 6 directly, which is, for example, possible in accordance with the exemplary embodiment using a slider already described.

FIG. 13 is related to a series circuit of a horn spark gap 1 with a varistor 100 that has a short-circuit device 102 that acts independently of the spark gap 1.

This arrangement necessitates a defined short-circuit current when the varistor 100 is overloaded, whereby the evaluation of the faulty follow-on current in the horn spark gap 1 can take place securely even in low-power grids.

Conceivable further damage to the varistor 100 due to an arc that may occur is also limited. The short-circuit device 102 of the varistor 100 can have an impedance which in very high-power grids reduces the short-circuit current without causing a significant limitation in grids with small expected short-circuit currents.

FIG. 14 relates to a series circuit of a horn spark gap with a further spark gap 200 that is based on a different functioning principle, for example the principal of the discharge of hard gas for suppressing the arc.

Spark gaps 200 of this type have a very strong follow-on current limitation, and may be frequently or entirely free from follow-on current under rated conditions.

The function according to FIG. 14 is similar to that of the series circuit shown with a varistor.

When in proper condition, the horn spark gap 1 does not participate in the quenching of power follow-on currents, or only does so very little.

Significant follow-on currents only occur in the spark gap 1 shortly before the end of the service life of the series-connected spark gaps 200, and these are acquired by the evaluation unit 5; 51 there, and may be evaluated as overload currents.

The disconnecting element for disconnecting the trigger circuit 2 of the spark gap 1 can, in addition to its own evaluation unit, also be driven as an alternative by evaluation units of the second spark gap 200.

If the spark gap 200 connected in series, as shown in the illustration, is provided with a trigger circuit 202, it is possible to use an overload indication of this trigger circuit 202 to drive the disconnecting element 6 of the horn spark gap 1. A firing pin of a fuse 201 of the trigger circuit 202 of the spark gap 200 can, for example, be used directly or indirectly for this purpose.

In the series circuit according to FIG. 14, the spark gap 200 can also be activated by a trigger circuit, which is directly coupled to the trigger circuit 2 of the horn spark gap. There is also a possibility that the spark gap 200 only has a highly simplified trigger circuit, or is even implemented in a purely "passive" form. These single spark gaps ignite even at low overvoltages, or even at the grid voltage. Such simplified trigger circuits, or "passively" igniting spark gaps, generally use elements made of conductive or semi-conductive materials, for example polymers or ceramics, and are inter alia known in series circuits from the prior art. It is, however, significant that such a "passively" igniting spark gap 200 in the series circuit according to FIG. 14 cannot contribute to the breakdown strength, and the spark gap 1 of the invention must therefore itself alone provide the desired breakdown and insulation strengths, both in the case of the disconnecting element 6 of the trigger circuit 2 and of the spark gap 1.

The invention claimed is:

1. An overvoltage protection arrangement comprising a horn spark gap (1) located in a housing, with a chamber (4) for arc quenching, wherein a trigger electrode (7) is located in an ignition region of the horn spark gap (1),
characterized in that
a disconnecting element (6) is provided that interrupts a connection between a trigger circuit (2) and the trigger electrode (7), and thus disconnects the trigger electrode (7), wherein the disconnecting element (6) is tripped or controlled by an evaluation unit (5; 51) that is subject to and reacts to a loading of a power follow-on current.

2. The overvoltage protection arrangement as claimed in claim 1,
characterized in that
the horn spark gap includes main electrodes; and
the trigger electrode (7) is connected via a voltage-limiting or voltage-switching element to one of the main electrodes (30) of the horn spark gap (1), and this connection can be interrupted by means of the disconnecting element (6).

3. The overvoltage protection arrangement as claimed in claim 1,
characterized in that
the evaluation unit (5; 51) is implemented as a fusible link (8; 81).

4. The overvoltage protection arrangement as claimed in claim 1,
characterized in that
the evaluation unit (5) is located in a region of the chamber (4) for arc quenching, or is connected to it.

5. The overvoltage protection arrangement as claimed in claim 1,
characterized in that
the evaluation unit (51) is located in an arc run region (13) of the follow-on current arc in the horn spark gap (1) or is connected to it.

6. The overvoltage protection arrangement as claimed in claim 1,
characterized in that
at least one further overvoltage protection element (1, 100, 200) such as a varistor or a spark gap is provided, wherein this can have independently operating protective measures for disconnection (101, 201, 6) or short-circuiting (102) of the element or of components of the element, and wherein these further overvoltage protection elements (1, 100, 200) are connected electrically in series with the horn spark gap (1).

7. The overvoltage protection arrangement as claimed in claim 1,
characterized in that
at least one further overvoltage protection element (1, 100, 200) such as a varistor or a spark gap is provided, wherein this is connected electrically in series with the horn spark gap (1) and has a device for evaluating its own loading that can act on the switch-like disconnecting element (6) of the trigger circuit of the first horn spark gap (1) independently of its evaluation device(s) (5, 51).

8. The overvoltage protection arrangement as claimed in claim 1,
characterized in that
at least one further overvoltage protection element (1) is connected electrically in series, wherein these elements of the series circuit each have at least one evaluation unit (5, 51), a trigger circuit (2) and a switch-like disconnecting element (6), wherein the disconnecting element (6) of the overvoltage protection elements connected in series is actuated when at least one arbitrary evaluation unit responds.

9. The overvoltage protection arrangement as claimed in claim 1,
characterized in that
a disconnecting device comprises a fusible link (8; 81) that is located in a region of the chamber (4) and is exposed there to the loading of a power follow-on current, wherein the fusible link (8; 81) holds a disconnecting element (6) in a first position, and on melting releases this disconnecting element (6) in such a way that the disconnecting element (6) adopts a second position wherein, on reaching the second position, the electrical connection to the trigger electrode (7) is interrupted and the trigger electrode (7) is thereby disconnected.

10. The overvoltage protection arrangement as claimed in claim 9,
characterized in that
the fusible link (8; 81) is contacted by spaced quench plates (9) of the chamber (4).

11. The overvoltage protection arrangement as claimed in claim 9, characterized in that
the fusible link (81) is arranged in an inlet region (13) of the chamber (4; 9).

12. The overvoltage protection arrangement as claimed in claim 9,
characterized in that
the disconnecting element (6) can also be tripped by a fusible link (8) that is located in the space (10) that is present above an ignition region of the horn spark gap (1).

13. The overvoltage protection arrangement as claimed in claim 9,
characterized in that
the spark gap includes running rails or horn electrodes; and
the fusible link (8) is connected to one of the running rails or horn electrodes (30; 31) of the spark gap (1).

14. The overvoltage protection arrangement as claimed in claim 9,
characterized in that
a slider (15) is arranged laterally next to the chamber (4) and actuates the disconnecting element (6).

15. The overvoltage protection arrangement as claimed in claim 9,
characterized in that
the slider (15) is largely arranged inside the chamber (4).

16. The overvoltage protection arrangement as claimed in claim 9,
characterized in that
the fusible link (81) is arranged without electrical potential in an inlet region (9b) or the chamber (4).

17. The overvoltage protection arrangement as claimed in claim 9,
characterized in that
the fusible link (8; 81) is fastened in a thermally sensitive manner.

18. The overvoltage protection arrangement as claimed in claim 10,
characterized in that
with the fusible link (8) partially routed outside the chamber (4) for activation of the disconnecting element (6), inflow openings or inflow channels (18) for a plasma resulting from the formation of an external arc are formed.

19. The overvoltage protection arrangement as claimed in claim 9, wherein the fusible link (8; 81) holds a disconnecting element (6), supported by spring force.

* * * * *